(12) United States Patent
Paredes

(10) Patent No.: US 9,077,553 B2
(45) Date of Patent: Jul. 7, 2015

(54) INTER-CARRIER DIFFERENTIATION USING THROUGHPUTS IN WIRELESS COMMUNICATION NETWORKS

(75) Inventor: Ricardo Aquiles Paredes, Ottawa (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 447 days.

(21) Appl. No.: 13/441,331

(22) Filed: Apr. 6, 2012

(65) Prior Publication Data

US 2013/0267225 A1  Oct. 10, 2013

(51) Int. Cl.
| | |
|---|---|
| H04W 4/00 | (2009.01) |
| H04L 1/00 | (2006.01) |
| H04L 12/26 | (2006.01) |
| H04L 12/28 | (2006.01) |
| H04L 12/16 | (2006.01) |
| H04L 12/24 | (2006.01) |
| H04W 12/08 | (2009.01) |

(52) U.S. Cl.
CPC ........... *H04L 12/2417* (2013.01); *H04W 12/08* (2013.01)

(58) Field of Classification Search
CPC ............................ H04L 12/2417; H04W 12/08
USPC ............. 455/410, 432.1, 422.1; 370/235, 230
See application file for complete search history.

(56) References Cited

U.S. PATENT DOCUMENTS

| | | | |
|---|---|---|---|
| 2007/0072587 A1* | 3/2007 | Della-Torre ................... | 455/410 |
| 2007/0220251 A1* | 9/2007 | Rosenberg et al. ........... | 713/156 |
| 2010/0085949 A1* | 4/2010 | von Brandt et al. .......... | 370/338 |
| 2011/0044198 A1 | 2/2011 | Persson et al. | |
| 2012/0028626 A1* | 2/2012 | Marocchi et al. .......... | 455/422.1 |

FOREIGN PATENT DOCUMENTS

| | | | |
|---|---|---|---|
| WO | 2009112639 A1 | 9/2009 | |
| WO | 2010125982 A1 | 11/2010 | |

OTHER PUBLICATIONS

3GPP TS 23.401 v11.1.0 (Mar. 2012) 3rd Generation Partnership Project; Technical Specification Group Services and System Aspects; General Packet Radio Service (GPRS) enhancements for Evolved Universal Terrestrial Radio Access Network (E-UTRAN) access (Release 11) consisting of 44-pages.
3GPP TS 23.203 v11.5.0 (Mar. 2012) 3rd Generation Partnership Project; Technical Specification Group Services and System Aspects; Policy and charging control architecture (Release 11) consisting of 175-pages.

(Continued)

*Primary Examiner* — Opiribo Georgewill
(74) *Attorney, Agent, or Firm* — Christopher & Weisberg, P.A.

(57) ABSTRACT

A method and system for controlling services received by a visiting subscriber to a visited network associated with a visited service provider are disclosed. According to one aspect, a request for the visiting subscriber to receive at least one service from the visited network is received at a node of the visited network. In response to the request, the visited network retrieves a quality of service to be afforded the visiting subscriber for each of the at least one service. The visited network determines whether to provide at least one of the at least one service to the visiting subscriber based at least in part on the quality of service and a current network load.

24 Claims, 4 Drawing Sheets

(56) References Cited

OTHER PUBLICATIONS

International_Search_Report_and_Written_Opinion dated Aug. 8, 2013 for International Application No. PCT/IB2013/051520, International Filing Date: Feb. 25, 2013 consisting of 11-pages.
PCT Notification Concerning Transmittal of Copy of International Preliminary Report on Patentability, Form PCT/IPEA/416, dated Sep. 11, 2014 for corresponding International Application No. PCT/IB2013/051520; International Filing Date: Feb. 25, 2013 consisting of 19-pages.
Written Opinion of the International Preliminary Examining Authority dated Jul. 17, 2014 for International Application No. PCT/IB2013/051520, International Filing Date: Feb. 25, 2013 consisting of 7-pages.

* cited by examiner

U.S. 9,077,553 B2

1

INTER-CARRIER DIFFERENTIATION USING THROUGHPUTS IN WIRELESS COMMUNICATION NETWORKS

TECHNICAL FIELD

The present invention relates to wireless communications, and in particular to a method and system for controlling provision of services to a visiting subscriber in a communication network.

BACKGROUND

An issue for service providers in a communication network is how a service provider of a visited network is to treat a customer of another service provider when the customer roams into the visited network. One possibility is for the service provider of the visited network to treat visiting subscribers the same as subscribers of the service provider of the visited network. Thus, both visiting and home subscribers could share the same quality of service and types of service provided by the provider of the visited network. This approach may be unsatisfactory since there may be constraints on the services and quality of service that can be provided to both visiting and home subscribers. On the other hand, a service provider of a visited network may desire to offer different qualities of service to visiting subscribers and home subscribers, pursuant to, for example, a service level agreement (SLA) between the service provider of the visited network and a service provider of the home network of the visiting subscribers. However, current Long Term Evolution (LTE) standards do not specify a method to differentiate services provided to visiting and home subscribers.

Thus, there is a need for a system and method of allocating resources to a visiting subscriber that roams into a visited network in a manner that allows differentiation in the provisioning of services between visiting subscribers and home subscribers.

SUMMARY

The present invention provides methods and systems for controlling services received by a visiting subscriber to a visited network associated with a visited service provider. According to one aspect, a request for the visiting subscriber to receive at least one service from the visited network is received at a node of the visited network. In response to the request, the visited network retrieves a quality of service to be afforded the visiting subscriber for each of the at least one service. The visited network determines whether to provide at least one of the at least one service to the visiting subscriber based at least in part on the quality of service and a current network load.

According to another aspect, the invention provides a network node for controlling services provided by a visited network to a visiting subscriber. The network node includes a memory that stores a minimum guaranteed bit rate (GBR) and a maximum GBR. The network node also includes a processor in communication with the memory. The processor performs at least one approval function to determine whether to provide a service to the visiting subscriber. The at least one approval function is based at least in part on at least one of the minimum GBR and the maximum GBR.

According to another aspect, the invention provides a method of controlling provision of a service by a network to a visiting subscriber. The method includes receiving a service request for the visiting subscriber. The service request specifies a service. The method includes retrieving at least one pre-determined parameter associated with a home network of the visiting subscriber. A service approval function is performed based on at least one of the at least one retrieved pre-determined parameters. In particular, the service approval function permits or denies the service to the visiting subscriber based on the retrieved pre-determined parameters.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
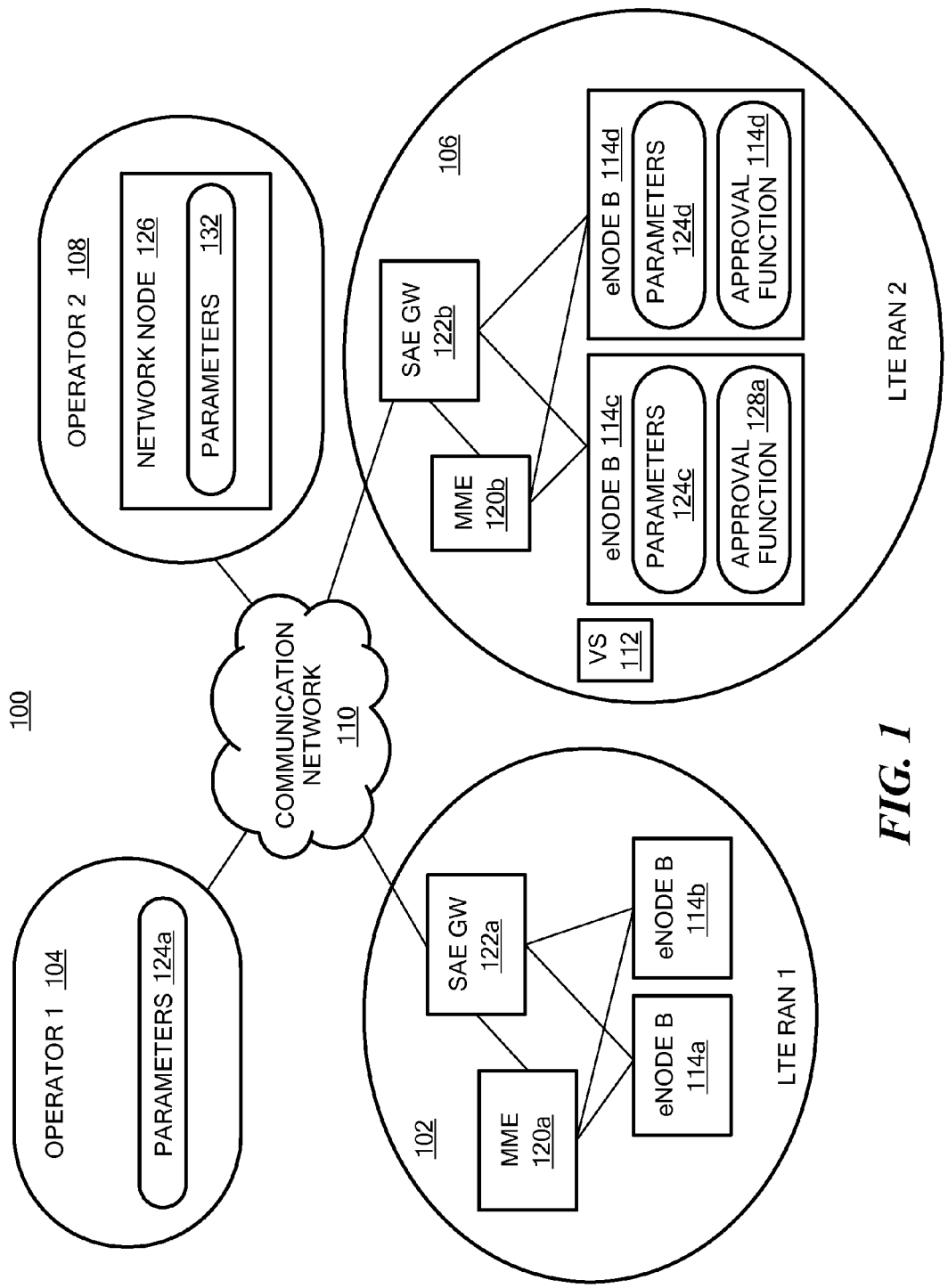
FIG. 1 is a block diagram of an exemplary communication system constructed in accordance with principles of the present invention.

Before describing in detail exemplary embodiments that are in accordance with the present invention, it is noted that the embodiments reside primarily in combinations of apparatus components and processing steps related to controlling the provision of services to a visiting subscriber by a visited network. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements In embodiments described herein, a service level agreement (SLA) between a home network service provider of a visiting subscriber and a visited network may be executed and in effect. In this case, the visited network service provider may decide, based on one or more terms of the SLA, whether to admit a visiting subscriber. The decision may be based on throughputs and number of connections, e.g., voice over Internet protocol (VoIP) connections, compiled by the visited network.

Referring now to the drawing figures, in which like reference designators denote like elements, there is shown in FIG. 1 an exemplary communication network 100 having a home radio access network (RAN) 102 associated with a first operator or service provider 104 and a visited radio access network 106 associated with a second operator or service provider 108. The first service provider 104 may communicate with the home network via a communication network 110 such as, for example, the Internet. The second service provider 108 may communicate with the visited network 106 using the communication network 110. Although only one radio access network is shown for each service provider in FIG. 1, there may be more than one radio access network associated with each service provider.

The visited network 106 may have a visiting subscriber 112 that is registered with the home network 102 but is not registered with the visited network 106. As used herein, it is understood that the term "visiting subscriber" such as visiting subscriber 112 refers to the user equipment (UE) of a visiting customer. As used herein, the home network 102 refers to the network where the visiting subscriber is registered and the visited network 106 is a network that a subscriber visits but with which the subscriber is not registered.

In one embodiment, the home network 102 and visited network 106 are wireless communication LTE networks. However, the invention is not limited to such. It is contemplated that the home network 102 and visited network 106 can be based on any suitable wireless communication network standard that can support and implement the functions described herein, for example, networks based on 3rd Generation Partnership Project (3GPP) technologies and standards.

Each radio access network, 102 and 106, may have a plurality of evolved nodes B (eNODE B), herein referred to as base stations 114, such as base stations 114a, 114b, 114c, and 114d. It is understood that the invention is not limited to LTE eNODE B base stations, and that other base station technologies may be used. When the visiting subscriber 112 is near base station 114c or 114d, it may seek to establish a connection with the base station 114c or 114d. The base stations 114 communicate with their respective mobile management entities (MME) 120a, 120b, referred to collectively as MMEs 120, which in turn communicate with their respective system architecture evolution (SAE) gateways (GW) 122a, 122b8, referred to collectively as SAE GWs 122. In turn, the SAE GWs 122 communicate with their respective operators 104 and 108 via the communication network 110. Note the configuration of the radio access networks 102 and 106 shown in FIG. 1 are exemplary. Different quantities of the elements of these networks may be employed than are shown, and their connectivity may be different from that shown. For example, a RAN may include more than two eNODE B elements, and more than one MME and/or SAE GW. In some embodiments, the eNODE B elements may be connected only to the MME and not directly to the SAE GW.

The operators or service providers 104 and 108 have respective parameters 124a and 124b, referred to collectively as parameters 124, which may include quality of service parameters associated with visiting subscribers and home subscribers. The parameters 124 may be stored in one or more of a multiple of network nodes or devices 140 associated with a service provider 104 and 108, for example a home subscriber server (HSS), a policy and charging rules function (PCRF) device, an authentication, authorization and accounting (AAA) device or an Internet Protocol (IP) multimedia subsystem (IMS).

When a visiting subscriber comes in the neighborhood, i.e., within range, of a base station 114c of radio access network 106 and communication between the base station 114c and the visiting subscriber 112 is established, the base station 114c will, via the MME 120b, the SAE GW 122b and the communication network 110, notify the service provider 108 of the presence of the visiting subscriber 112 in the visited network 106.

A node 126 of the service provider 108 stores the parameters 124b that may include quality of service (QoS) parameters for determining whether to approve, a request for service by the visiting subscriber 112. The QoS parameters 124b may be specified by a service level agreement (SLA) between a home network service provider 104 of the visiting subscriber and the service provider 108 of the visited network 106, or may be established by the service provider 108 of the visited network 106 without regard to an agreement. In some embodiments, these parameters 124b are also stored locally at the base stations 114c and 114d of the radio access network (RAN) 106, shown as parameters 124c and 124d, respectively.

In one scenario, the visiting subscriber 112 enters the visited network 106 and sends a request to the base station 114c of the RAN 106 for one or more services. Each base station 114c and 114d, has an approval function 128a and 128b, respectively. Upon receipt of the request, the service approval function 128a determines, based on parameters 124c4, whether to admit the subscriber, and/or approve the service or services requested by the visiting subscriber 112. In another scenario, the visiting subscriber 112 is already admitted to the visited network 106 and is now requesting a new service. Upon receipt of the new request, the service approval function 128a determines, based on quality of service (QoS) parameters 124c4, whether to approve the new service requested by the visiting subscriber 112. In yet another scenario, the visiting subscriber 112 may be powered down initially, and then awaken within the visited network 106. Upon awakening, the visiting subscriber 112 may request a new service. Once again, upon receipt of the request from the visiting subscriber 112, the service approval function 128a determines, based on parameters 124c, whether to approve the service requested by the visiting subscriber 112. Thus, in FIG. 1, the service approval function 128a is located at the base station 114c. In an alternative embodiment, the service approval function may be located at the centralized network node 126.

Figure 2:
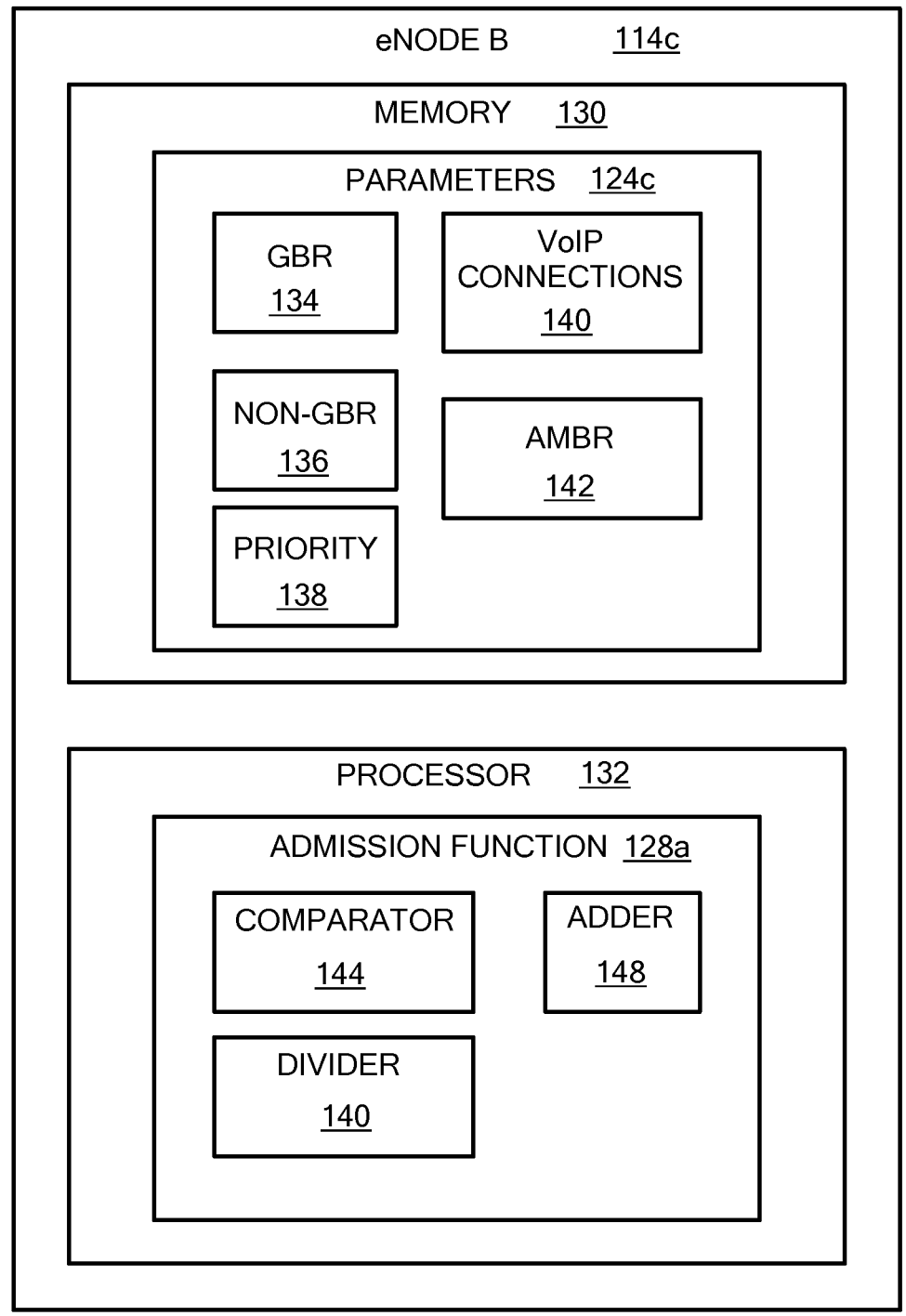
FIG. 2, is a block diagram of an exemplary node constructed in accordance with principles of the present invention.

FIG. 2 shows a more detailed view of an exemplary base station 114c of the service provider 108 of the visited network 106, that may be employed to implement the service control functions described herein. The base station 114c has a memory 130 and a processor 132. The memory 130 stores the QoS parameters 124c4 upon which a service approval function 128a is based. Note that other components may be included in the base station 114c such as interfaces, displays, bus structures, etc. These components are not shown in FIG. 2 for ease of understanding the invention.

The QoS parameters 124c may include guaranteed bit rate (GBR) data 134 such as minimum and maximum GBRs. The parameters 124c4 may also include non-guaranteed bit rate data 136 such as a minimum and maximum non-GBR. The parameters 124c may also include priority data 138, voice over Internet protocol (VoIP) data 140, and aggregate maximum bit rate (AMBR) data 142. In some embodiments, these parameters are specified for a home service provider 104 of visiting subscribers 112 according to a service level agreement (SLA) between the home service provider 104 and the service provider 108 of the visited network 106.

The processor 132 performs one or more service approval functions 128a described herein. In another embodiment, the service approval functions 128a may be distributed and performed in more than one node. The service approval functions 1128a may include a comparator 144 to compare one or more of the parameters 124c to a threshold, a divider 146 to form a ratio of parameters, and an adder 148 to accumulate parameters, and the like. For example, the adder 148 may compute a sum of a current aggregated guaranteed bit rate (GBR) of the visited service provider 108 and a current aggregate maximum bit rate (AMBR) of the visiting subscriber 112, and the comparator 144 may compare this sum to a minimum GBR specified by an SLA.

Table 1, below, indicates exemplary service level agreement configurations to limit throughput and connections of a visiting subscriber 112 based on an SLA between the visiting subscriber's vendor 104 (home service provider) and the service provider 108 of the visited network 106. In Table 1, the term "vendor" refers to the home network service provider 104 of the visiting subscriber 112. Although Table 1 and the corresponding discussion herein is referenced to an SLA, it is understood that the parameters of Table 1 can be based solely on parameters established by the service provider 108 of the visited network 106 without regard to any actual agreement.

service provider plus a current aggregated maximum bit rate (AMBR) of the visiting subscriber, and provide a service when the minimum GBR is greater than the current aggregated GBR of the visited service provider plus the current AMBR of the visiting subscriber for the uplink and the downlink. This is represented by the following code:

```
If (congestionThreshold reached)
  GBRAdmissionAllowed =
    (Min-U-GBR_{SLAI} >= U-GBR_{SLAI} + UE-U-GBR) and
    (Min-D-GBR_{SLAI} >= D-GBR_{SLAI} + UE-D-GBR)
```

TABLE 1

| SLAI | Vendor's Priority | Direction | Vendor's Minimum/ Maximum Aggregated Throughput | Vendor's Maximum Aggregated MBR (parameter names) | Vendor's Minimum/ Maximum Non-GBR Throughput Allowed (parameter names) | Vendor's Minimum/ Maximum Number of VoIP Connections (simultaneous) |
|---|---|---|---|---|---|---|
| 1 | 1 (highest) | Uplink | 200 mbps/400 mbps | (Min-U-GBR$_1$/ Max-U-GBR$_1$) 50 mbps/100 mbps | (Min-U-nonGBR$_1$/ Max-U-nonGBR$_1$) 150 mbps/300 mbps | (Min-U-VoIP$_1$/ Max-U-VoIP$_1$) 20/50 |
|   | 1 | Downlink | 400 mbps/800 mbps | (Min-D-GBR$_1$/ Max-D-GBR$_1$) 100 mbps/300 mbps | (Min-D-nonGBR$_1$/ Max-D-nonGBR$_1$) 300 mbps/500 mbps | (Min-D-VoIP$_1$/ Max-D-VoIP$_1$) 20/50 |
| ... | ... | ... | | | | |
| y | 255 (lowest) | Uplink: | 0 mbps/264 mbps | (Min-U-GBR$_{255}$/ Max-U-GBR$_{255}$) 64 mbps/100 mbps | (Min-U-nonGBR$_{255}$/ Max-U-nonGBR$_{255}$) 0 mbps/164 mbps | (Min-U-VoIP$_{255}$/ Max-U-VoIP$_{255}$) 10/20 |
|   | 255 | Downlink | 0 mbps/464 mbps | (Min-D-GBR$_{255}$/ Max-D-GBR$_{255}$) 64 mbps/164 mbps | (Min-D-nonGBR$_{255}$/ Max-D-nonGBR$_{255}$) 0 mbps/300 mbps | (Min-D-VoIP$_{255}$/ Max-D-VoIP$_{255}$) 10/20 |

Note that the SLA can be based on a single value or a range of values. When based on a single value, the single value may be a maximum or minimum value. When a range is specified, the minimum value may be interpreted as what the visited network is willing to provide during periods of congestion of the visited network. The SLAI is an identifier associated with a service level agreement which may be configured in a centralized node or in each node that uses it. The SLAI provides a way to associate a service level agreement between two service providers with an identifier that can easily be communicated to all nodes that use it. The actual SLA details may be signaled from a centralized node to other distributed nodes.

As shown in Table 1, an SLA may specify a minimum and/or maximum of any one or more of six variables: U-GBR, D-GBR, U-nonGBR, D-nonGBR, U-VoIP and D-VoIP, where U indicates the uplink direction and D indicates the downlink direction. Other variables may also be specified. When a visiting subscriber 112 requests service from the visited network 106, the SLA tables are checked to map the visiting subscriber's international mobile subscriber identity (IMSI) to a home network 102 of the visiting subscriber 112 and the service provider 104 associated with the home network 102. Specified QoS parameters are retrieved from the tables and are used to decide if the visiting subscriber 112 will be admitted into the visited network 106 and/or whether a requested service or number of VoIP connections can be provided.

The service approval function 128a may depend on whether a network is congested. For example, if the visited network 106 is congested, the base station 14c may determine, for the uplink and the downlink, whether a minimum GBR is greater than a current aggregated GBR of the visited Conversely, if the visited network 106 is not congested, the base station 114c may determine, for the uplink and the downlink, whether a specified maximum GBR is greater than the current GBR of the visited service provider 108 plus the current AMBR of the visiting subscriber 112, and provide a service when the specified maximum GBR is greater than the current GBR of the visited service provider 108 plus the current AMBR of the visiting subscriber 112 for the uplink and the downlink. This is represented by the following code:

```
If (congestionThreshold NOT reached)
  GBRAdmissionAllowed =
    (Max-U-GBR_{SLAI} >= U-GBR_{SLAI} + UE-D-GBR) and
    (Max-D-GBR_{SLAI} >= D-GBR_{SLAI} + UE-D-GBR)
```

Further, if the visited network 106 is congested, the base station 114c may determine, for the uplink and the downlink, whether a specified minimum non-guaranteed bit rate is greater than a current non-GBR of the visited service provider 108 plus a current AMBR of the visiting subscriber 112, and provide a service when the specified minimum non-GBR is greater than the current non-GBR of the visited service provider 108 plus the current AMBR of the visiting subscriber 112 for the uplink and the downlink. This is represented by the following code:

```
If (congestionThreshold reached)
  nonGBRAdmissionAllowed =
    (Min-U-nonGBR_{SLAI} >= U-nonGBR_{SLAI} + UE-U-nonGBR) and
    (Min-D-nonGBR_{SLAI} >= D-nonGBR_{SLAI} + UE-D-nonGBR)
```

Conversely, if the visited network 106 is not congested, the base station 114c may determine, for the uplink and the downlink, whether a specified maximum non-GBR is greater than the current non-GBR of the visited service provider 108 plus the current AMBR of the visiting subscriber 112, and providing a service when the specified maximum non-GBR is greater than the current non-GBR of the visited service provider 108 plus the current AMBR of the visiting subscriber 112 for the uplink and the downlink. This is represented by the following code:

```
If (congestionThreshold NOT reached)
nonGBRAdmissionAllowed =
    (Max-U-nonGBR_{SLAI} >= U-nonGBR_{SLAI} + UE-D-nonGBR) and
    (Max-D-nonGBR_{SLAI} >= D-nonGBR_{SLAI} + UE-D-nonGBR)
```

Further, if the visited network 106 is congested, the base station 114c may determine, for the uplink and the downlink, whether a specified minimum number of VoIP connections is greater than a current number of VoIP connections of the visited service provider 108 plus a current number of VoIP connections of the visiting subscriber 112, and provide a service when the specified minimum number of VoIP connections is greater than the current number of VoIP connections of the visited service provider 108 plus the current number of VoIP connections of the visiting subscriber 112 for the uplink and the downlink. This is represented by the following code:

```
If (congestionThreshold reached)
VoIPAdmissionAllowed =
    (Min-U-VoIP_{SLAI} >= U-VoIP_{SLAI} + UE-U-VoIP) and
    (Min-D-VoIP_{SLAI} >= D-VoIP_{SLAI} + UE-D-VoIP)
```

Conversely, if the visited network 106 is not congested, the base station 114c may determine, for the uplink and the downlink, whether a specified maximum number of VoIP connections is greater than a current number of VoIP connections of the visited service provider 108 plus a current number of VoIP connections of the visiting subscriber 112, and provide a service when the specified maximum number of VoIP connections is greater than the current number of VoIP connections of the visited service provider 108 plus the current number of VoIP connections of the visiting subscriber 112 for the uplink and the downlink. This is represented by the following code

```
If (congestionThreshold NOT reached)
VoIPAdmissionAllowed =
    (Max-U-VoIP_{SLAI} >= U-VoIP_{SLAI} + UE-D-VoIP) and
    (Max-D-VoIP_{SLAI} >= D-VoIP_{SLAI} + UE-D-VoIP)
```

The visiting subscriber 112 may be admitted, or a requested service may be allowed, if one or more of the logical variables—GBRAdmissionAllowed, nonGBrAdmissionAllowed and VoIPAdmissionAllowed—are true. Note that the parameters provided in Table 1 may have no impact on a decision to admit a visiting subscriber that has no services yet created, i.e., no services in use or requested, in the visiting network. Also note that the visiting subscriber's aggregated GBR—represented by the variable UE-D-GBR and UE-U-GBR—may be calculated as the sum of the GBR parameters associated with each GBR bearer of the visiting subscriber 112. Also note that the visiting subscriber's aggregated non-GBR may be determined by examining the subscriber AMBR parameter or, if available, by adding the non-GBR for every non-GBR bearer of the visiting subscriber 112.

In the alternative to, or in addition to, the comparisons described above, which may be used to admit or deny admission of a visiting subscriber 112 to the visited network 106, a service admission control function may monitor resource utilization of the visited network 106 to make a decision whether to allow a service for the visiting subscriber 112. Two variables are defined for GBR services, one for the uplink and one for the downlink:

service-U-GBR=uplink GBR signaled with the service request.

service-D-GBR=downlink GBR signaled with the service request.

An exemplary admission decision calculation for an uplink service is:

$$\text{GBR-}U\text{-service-allowed}=(\text{Max-}U\text{-GBR}_{SLAI}>=\text{service-}U\text{-GBR}+U\text{-GBR}_{SLAI})$$

An exemplary admission decision calculation for a downlink service is:

$$\text{GBR-}D\text{-service-allowed}=(\text{Max-}D\text{-GBR}_{SLAI}>=\text{service-}D\text{-GBR}+D\text{-GBR}_{SLAI})$$

Similarly, for non-GBR services the following variables and calculations are defined:

service-U-nonGBR is the estimated uplink non-GBR rate to be used in the admission decision for the requested service.

service-D-nonGBR is the estimated downlink non-GBR rate to be used in the admission decision for the requested service.

UE-U-non-GBR-Bearers is the number of uplink non-GBR bearers that the UE currently has.

UE-D-non-GBR-Bearers is the number of downlink non-GBR bearers that the UE currently has.

U-non-GBR-Bearers$_{SLAI}$ is the number of uplink non-GBR bearers currently being served by the node for vendor associated with this SLA.

D-non-GBR-Bearers$_{SLAI}$ is the number of downlink non-GBR bearers currently being served by the node for vendor associated with this SLA.

An exemplary admission decision includes computing as follows:

```
If (congestion detected)
service-U-non-GBR =
    Min( (UE-U-non-GBR / (UE-U-non-GBR-Bearers + 1)),
    (Min-U-non-GBR_{SLAI} / (U-non-GBR-Bearers_{SLAI} + 1)) )
service-D-nonGBR =
    Min( (UE-D-non-GBR / (UE-D-non-GBR-Bearers + 1)),
    (Min-D-non-GBR_{SLAI} / (D-non-GBR-Bearers_{SLAI} + 1)) )
If (no congestion detected)
service-U-non-GBR =
    Min( (UE-U-non-GBR / (UE-U-non-GBR-Bearers + 1)),
    (Max-U-non-GBR_{SLAI} / (U-non-GBR-Bearers_{SLAI} + 1)) )
service-D-non-GBR =
    Min( (UE-D-non-GBR / (UE-D-non-GBR-Bearers + 1)),
    (Max-D-non-GBR_{SLAI} / (D-non-GBR-Bearers_{SLAI} + 1)) )
```

An exemplary admission decision calculation for the uplink direction of the service is:

$$\text{non-GBR-}U\text{-service-allowed}=(\text{Max-}U\text{-non-GBR}_{SLAI}>=\text{service-}U\text{-non-GBR}+U\text{-non-GBR}_{SLAI})$$

An exemplary admission decision calculation for the downlink direction of the service is:

$$\text{non-GBR-}D\text{-service-allowed}=(\text{Max-}D\text{-non-GBR}_{SLAI}>=\text{service-}D\text{-non-GBR}+D\text{-non-GBR}_{SLAI})$$

For VoIP services, exemplary admission procedures are as follows:

```
If (congestionThreshold reached)
   VoIPAdmissionAllowed =
      (Min-U-VoIP_{SLAi} >= U-VoIP_{SLAi} + 1) and
      (Min-D-VoIP_{SLAi} >= D-VoIP_{SLAi} + 1)
If (congestionThreshold NOT reached)
   VoIPServiceAdmissionAllowed =
      (Max-U-VoIP_{SLAi} >= U-VoIP_{SLAi} + 1) and
      (Max-D-VoIP_{SLAi} >= D-VoIP_{SLAi} + 1)
```

The throughput variables and counters introduced above are calculated at fixed configurable intervals, and are defined as follows:

- U-non-GBR-Bearers$_{SLAi}$: Counts the number of uplink non-GBR bearers in the node for an SLA.
- D-non-GBR-Bearers$_{SLAi}$: Counts the number of downlink non-GBR bearers in the node for an SLA.
- U-GBR-Bearers$_{SLAi}$: Counts the number of uplink GBR bearers in the node for an SLA.
- D-GBR-Bearers$_{SLAi}$: Counts the number of downlink GBR bearers in the node for an SLA.
- U-VoIP$_{SLAi}$: Counts the number of uplink VoIP bearers in the node for an SLA.
- D-VoIP$_{SLAi}$: Counts the number of downlink VoIP bearers in the node for an SLA.
- U-GBR$_{SLAi}$: Stores the computed average uplink aggregated throughput for an SLA for GBR traffic.
- D-GBR$_{SLAi}$: Stores the computed average downlink aggregated throughput for an SLA for GBR traffic.
- U-non-GBR$_{SLAi}$: Stores the computed average uplink aggregated throughput for an SLA for non-GBR traffic.
- D-non-GBR$_{SLAi}$: Stores the computed average downlink aggregated throughput for an SLA for non-GBR traffic.

Thus, one embodiment is a base station 114c for controlling services provided by a visited network 106 to a visiting subscriber 112. The base station 114c includes a memory 130 and a processor 132. The memory stores QoS data 124c, which may include GBR data 134 and non GBR data 136. The processor 132 performs a service approval function 128a based at least in part on the QoS data 124c. The QoS data 124c may be based upon, or derived from, a service level agreement (SLA) between the home service provider 104 of the visiting subscriber 112 and the service provider 108 of the visited network 106. More particularly, the SLA may specify a minimum GBR, a minimum non-GBR, a maximum GBR, a maximum non-GBR, a minimum number of VoIP connections, and a maximum number of VoIP connections. The SLA may also specify a priority associated with the visiting subscriber 112 or the visiting subscriber's home service provider 104, so that service levels afforded to the visiting subscriber 112 may be based on the specified priority.

Figure 3:
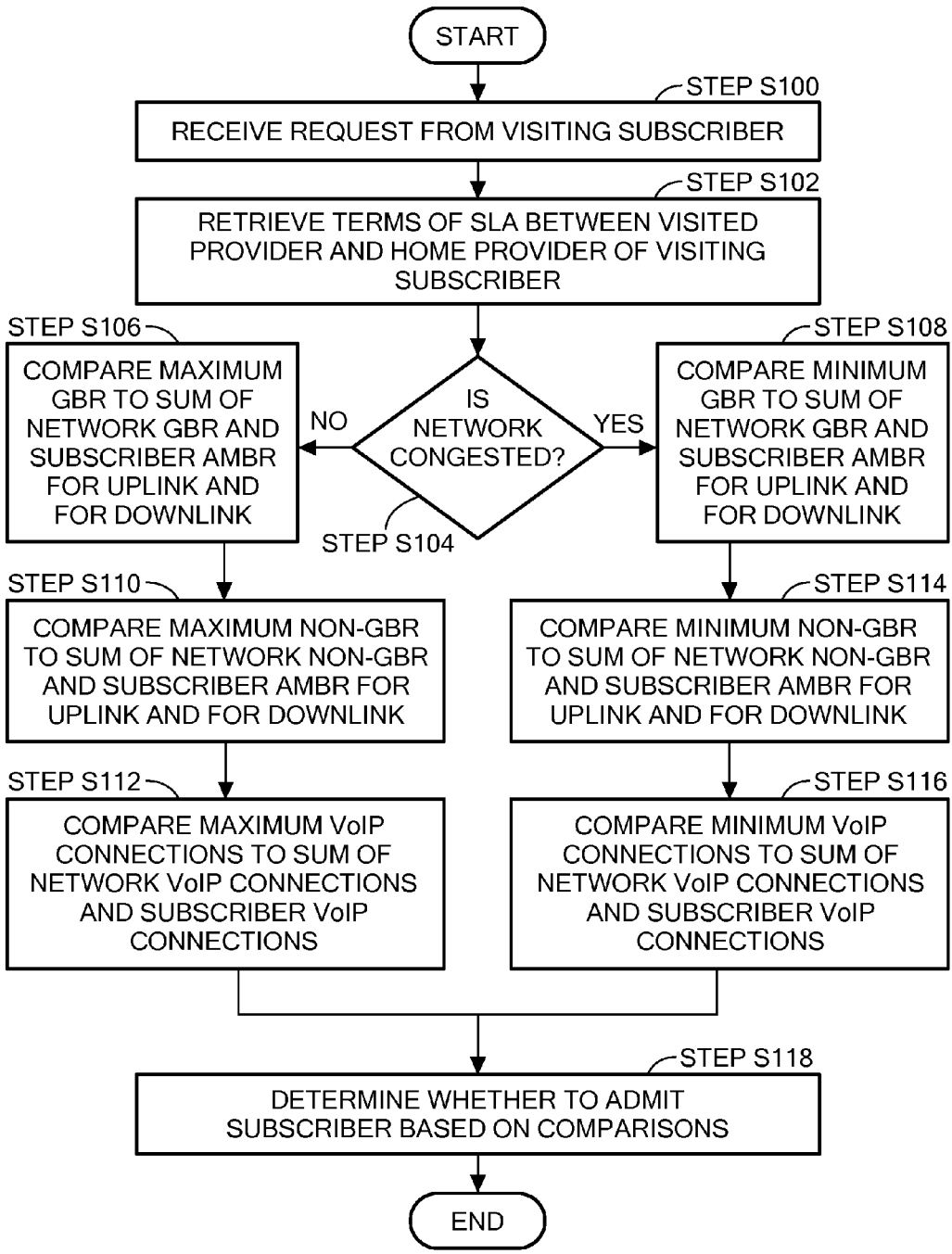
FIG. 3 is a flowchart of an exemplary process for controlling provision of services by a visited network to a visiting subscriber.

FIG. 3 is a flowchart of an exemplary process for controlling provision of services by a visited network 106 to a visiting subscriber 112. A request is received from a visiting subscriber 112 (step S100). In response to the request, a base station 114c may retrieve terms of an SLA between the visited provider 108 and the home provider 104 of the visiting subscriber 112 (step S102). A determination is made as to whether the visited network 106 is congested (step S104). If the visited network 106 is not congested, a comparison is made of a maximum GBR to a sum of a current GBR of the visited network 106 and the visiting subscriber 112 aggregate maximum bit rate (AMBR) (step S106). If the visited network 106 is congested, a comparison is made of a minimum GBR to a sum of the current GBR of the visited network 106 and the visiting subscriber 112 AMBR (step S108).

Proceeding from step S106, if the visited network 106 is not congested, a comparison is made of a maximum non-GBR to the sum of the current visited network 106 non-GBR and visiting subscriber 112 AMBR (step S110). Then, a comparison may be made of a maximum number of VoIP connections to a sum of VoIP connections of the visited network 106 and a number of subscriber VoIP connections (step S112).

Proceeding from step S108, if the visited network 106 is congested, a comparison may be made of a minimum non-GBR to a sum of the visited network 106 non-GBR and the visiting subscriber 112 AMBR (step S114). Then a comparison may be made of a minimum number of VoIP connections to a sum of the visited network 106 VoIP connections and the subscriber VoIP connections (step S116).

Finally, a decision is made whether to provide the requested service to the visiting subscriber 112 based on the comparisons (step S108). Note, that one or more of steps 106 through 116 may be omitted. Moreover, the invention is not limited to the order of steps S106-S112 and the order of steps S108, S114 and S116 as shown. It is contemplated that the order of these steps may be altered.

Figure 4:
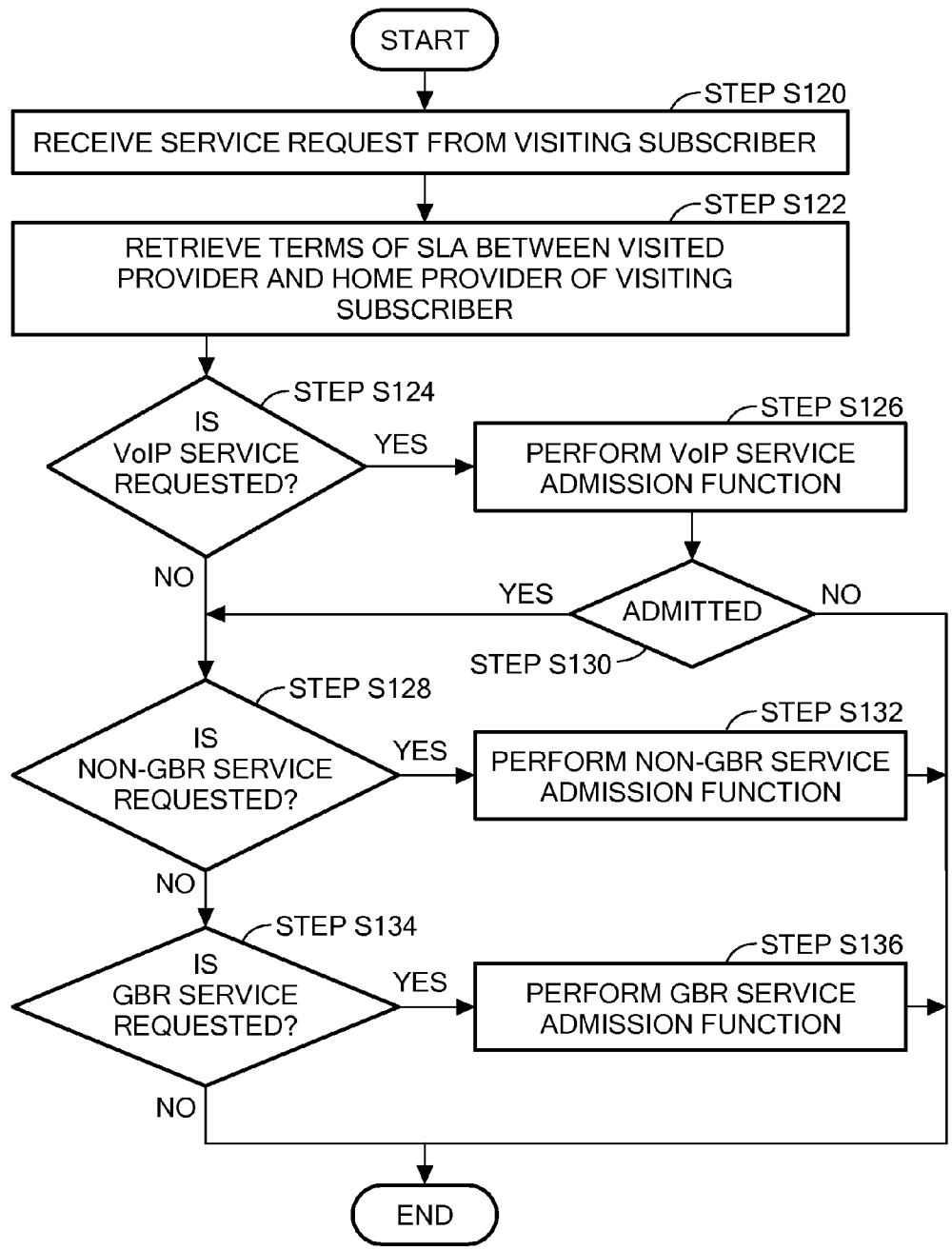
FIG. 4 is a flowchart of an exemplary process for controlling provision of services by a visited network to a visiting subscriber.

FIG. 4 is a flowchart of an exemplary process for controlling provision of services to a visiting subscriber 112 to a visited network 106. A request is received from the visiting subscriber 112 (step S120). In response to the request, terms of an SLA between the visited service provider 106 and a home service provider 104 of the visiting subscriber 112 are retrieved (step S122).

A determination is made as to whether a VoIP service is requested (step S124). If so, a VoIP service admission function is performed to determine whether to approve the requested VoIP service (step S126). If VoIP service is not requested, a determination is made whether a non-GBR service is requested (step S128). If VoIP service is requested and the requested VoIP service is approved, a determination to admit the visiting subscriber 112 is made (step S130). If admitted, a determination is made whether a non-GBR service is requested (step S128).

If a non-GBR service is requested, a non-GBR service admission function is performed to determine whether to approve the requested non-GBR service (step S134). If a non-GBR service is not requested, a determination is made whether GBR service is requested (step S134). If GBR service is requested, a determination is made whether to admit the visiting subscriber 112 for a GBR service (step S136). Note that some steps in FIG. 4 may be omitted or performed in a different order than shown.

Thus, embodiments provide a method to differentiate vendors by assigning priorities based on service level agreements (SLA) or other arrangement between the vendors, or a unilateral decision may be made by the service provider 108 of the visited network 106. Throughputs of data to a visiting subscriber 112 may be limited according to terms of an SLA between a home service provider 104 of the visiting subscriber 112 and a service provider 108 of the visited network 106. Note, that based on SLA terms, admission of a visiting subscriber 112, or approval of a service, may be denied. Note also, that expected throughput may be estimated based on use of existing services by the visiting subscriber 112 and/or based on existing services of the service provider 108 of the visited network 106.

The present invention can be realized in hardware, or a combination of hardware and software. Any kind of computing system, or other apparatus adapted for carrying out the methods described herein, is suited to perform the functions described herein. A typical combination of hardware and software could be a specialized computer system, having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method of controlling services received by a visiting subscriber to a visited network associated with a visited service provider, the method comprising:
   receiving, at a node of the visited network, a request for the visiting subscriber to receive at least one service from the visited network;
   retrieving, in response to the request, a quality of service to be afforded the visiting subscriber for each of the at least one service, the quality of service including a minimum guaranteed bit rate, GBR, threshold;
   determining whether to provide at least one of the at least one service to the visiting subscriber, based at least in part on:
      the quality of service to be afforded the visiting subscriber for the at least one service; and
      a current network load;
   the determining including comparing the minimum GBR threshold and a maximum GBR threshold to a sum of a current GBR resource usage of a service provider associated with the visiting subscriber and a current aggregate maximum bit rate, AMBR, of the service provider associated with the visiting subscriber.

2. The method of claim 1, wherein the at least one service is at least one initial service that is provided to a user equipment of the visiting subscriber in response to the user equipment awakening in the visited network.

3. The method of claim 1, wherein the at least one service is a service that is already provided to the visiting subscriber by a home network from which the subscriber roams.

4. The method of claim 1, wherein the at least one service is a new service to be provided to a visiting subscriber already admitted to the visited network.

5. The method of claim 4, wherein the network retrieves, from a home network of the subscriber, a quality of service identifier.

6. The method of claim 1, wherein at least one of the at least one service is a modification of a service already provided to the visiting subscriber by the visited network.

7. The method of claim 1, wherein the at least one service is requested by a remote network.

8. The method of claim 1, wherein the quality of service is based on at least one term in an agreement between the visited service provider and a home service provider of the visiting subscriber.

9. A method of controlling services received by a visiting subscriber to a visited network associated with a visited service provider, the method comprising:
   receiving, at a node of the visited network, a request for the visiting subscriber to receive at least one service from the visited network;
   retrieving, in response to the request, a quality of service to be afforded the visiting subscriber for each of the at least one service;
   determining whether to provide at least one of the at least one service to the visiting subscriber, based at least in part on:
      the quality of service to be afforded the visiting subscriber for the at least one service; and
      a current network load;
   the quality of service including a minimum number of Voice-over-Internet-Protocol, VoIP, connections, and determining whether to provide at least one of the at least one service to the visiting subscriber including determining whether a number of available VoIP connections available from the visited service provider exceeds the minimum number of VoIP connections.

10. The method of claim 1, wherein determining whether to provide at least one of the at least one service to the visiting subscriber further includes determining whether a congestion threshold of the visited network is reached.

11. The method of claim 1, wherein, when a determination is made to provide at least one service to the visiting subscriber, a limit is imposed by the visited network on a guaranteed bit rate, GBR, allocated to the visiting subscriber.

12. The method of claim 1, wherein, when a determination is made to provide at least one service to the visiting subscriber, a limit is imposed by the visited network on a number of voice-over-Internet-protocol, VoIP, connections allocated to the visiting subscriber.

13. A method of controlling services received by a visiting subscriber to a visited network associated with a visited service provider, the method comprising:
   receiving, at a node of the visited network, a request for the visiting subscriber to receive at least one service from the visited network;
   retrieving, in response to the request, a quality of service to be afforded the visiting subscriber for each of the at least one service;
   determining whether to provide at least one of the at least one service to the visiting subscriber, based at least in part on:
      the quality of service to be afforded the visiting subscriber for the at least one service; and
      a current network load;
   determining whether to provide at least one of the at least one service to the visiting subscriber further including:
   when the visited network is congested:
      determining, for the uplink and for the downlink, whether a minimum guaranteed bit rate, GBR, is greater than a current aggregated GBR of the visited service provider plus a current aggregate maximum bit rate, AMBR, of the subscriber; and
      providing the at least one service to the visiting subscriber when the minimum GBR is greater than the current GBR of the visited service provider plus the current AMBR of the subscriber for the uplink and the downlink; and when the visited network is not congested:
  determining, for the uplink and for the downlink, whether a specified maximum GBR is greater than the current GBR of the visited service provider plus the current AMBR of the subscriber; and
  providing the at least one service to the visiting subscriber when the specified maximum GBR is greater than the current GBR of the visited service provider plus the current AMBR of the subscriber for the uplink and the downlink.

14. The method of claim 13, wherein determining whether to provide at least one of the at least one service to the visiting subscriber further includes:
when the visited network is congested:
  determining, for the uplink and for the downlink, whether a specified minimum non-GBR is greater than a current non-GBR of the visited service provider plus a current AMBR of the subscriber; and
  providing the at least one service to the visiting subscriber when the specified minimum non-GBR is greater than the current non-GBR of the visited service provider plus the current AMBR of the subscriber for the uplink and for the downlink; and
when the visited network is not congested:
  determining, for the uplink and for the downlink, whether a specified maximum non-GBR is greater than the current non-GBR of the visited service provider plus the current AMBR of the subscriber; and
  providing the at least one service to the visiting subscriber when the specified maximum non-GBR is greater than the current non-GBR of the visited service provider plus the current AMBR of the subscriber.

15. The method of claim 14, wherein determining whether to provide at least one of the at least one service includes:
when the visited network is congested:
  determining, for the uplink and for the downlink, whether a specified minimum number of voice-over-Internet-protocol, VoIP, connections is greater than a current number of VoIP connections of the visited service provider plus a current number of VoIP connections of the subscriber; and
  providing the at least one service to the visiting subscriber when the specified minimum number of VoIP connections is greater than the current number of VoIP connections of the visited service provider plus the current number of VoIP connections of the subscriber for the uplink and for the downlink; and
when the visited network is not congested:
  determining, for the uplink and for the downlink, whether a specified maximum number of VoIP connections is greater than the current number of VoIP connections of the visited service provider plus the current number of VoIP connections of the subscriber; and
  providing the at least one service to the visiting subscriber when the specified maximum number of VoIP connections is greater than the current number of VoIP connections of the visited service provider plus the current number of VoIP connections of the subscriber for the uplink and for the downlink.

16. A network node for controlling services provided by a visited network to a visiting subscriber, the network node comprising:
  a memory, the memory storing a minimum guaranteed bit rate, GBR, threshold and a maximum GBR threshold; and
  a processor in communication with the memory, the processor performing at least one approval function to determine whether to provide a service to the visiting subscriber, the determining including comparing the minimum GBR threshold and the maximum GBR threshold to a sum of a current GBR resource usage of a service provider associated with the visiting subscriber and a current aggregate maximum bit rate, AMBR, of the service provider associated with the visiting subscriber.

17. The network node of claim 16, wherein the minimum GBR threshold and the maximum GBR threshold are based on terms of an agreement between a service provider of the visited network and another service provider associated with the visiting subscriber.

18. A network node for controlling services provided by a visited network to a visiting subscriber, the network node comprising:
  a memory, the memory storing a minimum guaranteed bit rate, GBR, threshold and a maximum GBR threshold; and
  a processor in communication with the memory, the processor performing at least one approval function to determine whether to provide a service to the visiting subscriber, the at least one approval function based at least in part on at least one of the minimum GBR threshold and the maximum GBR threshold;
  at least one of the at least one approval function to determine whether to provide a service to the visiting subscriber being based at least in part on:
    a minimum non-GBR threshold and a maximum non-GBR threshold configured by a service provider associated with the visiting subscriber; and
    a minimum number of voice-over-Internet-protocol, VoIP, connections and a maximum number of voice-over-Internet-protocol, VoIP, connections, the minimum and maximum number of connections being specified by the service provider associated with the visiting subscriber.

19. The network node of claim 18, wherein at least one of the at least one approval function includes a comparison of the minimum non-GBR threshold and the maximum non-GBR thresholds to a sum of a current non-GBR resource usage of the service provider of the visiting subscriber and a current estimated aggregate maximum bit rate, AMBR, of the service provider associated with the visiting subscriber.

20. The network node of claim 18, wherein at least one of the at least one approval function includes a comparison of one of the minimum number of VoIP connections and the maximum number of VoIP connections to a sum of a current number of VoIP connections of the visited network and a current number of VoIP connections being approved for the service provider associated with the visiting subscriber.

21. A network node for controlling services provided by a visited network to a visiting subscriber, the network node comprising:
  a memory, the memory storing a minimum guaranteed bit rate, GBR, threshold and a maximum GBR threshold; and
  a processor in communication with the memory, the processor performing at least one approval function to determine whether to provide a service to the visiting subscriber, the at least one approval function based at least in part on at least one of the minimum GBR threshold and the maximum GBR threshold; at least one of the at least one approval function includes including a comparison of the minimum GBR and the maximum GBR thresholds to a sum of a current GBR resource usage of the service provider associated with the visiting subscriber and a current aggregate maximum bit rate (AMBR) of the service provider associated with the visiting subscriber.

22. A method of controlling provision of a service by a visited network to a visiting subscriber, the method comprising:

receiving a service request for the visiting subscriber, the service request specifying a service;

retrieving at least one pre-determined parameter associated with a home network of the visiting subscriber; and performing a service approval function based on at least one of the at least one retrieved pre-determined parameters, the service approval function one of permitting and denying service to the visiting subscriber, the service approval function based at least in part on comparing a minimum guaranteed bit rate, GBR, threshold and a maximum GBR threshold to a sum of a current GBR resource usage of a service provider associated with the visiting subscriber and a current aggregate maximum bit rate, AMBR, of the service provider associated with the visiting subscriber.

23. The method of claim 22, wherein a pre-determined parameter is a quality of service identifier associated with the service and associated with a service provider of the visiting subscriber.

24. The method of claim 22, wherein the specified service is a non-guaranteed bit rate, non-GBR, service and the at least one pre-determined parameter includes a number of non-GBR bearers.

\* \* \* \* \*